US006765603B2

(12) United States Patent
Border et al.

(10) Patent No.: US 6,765,603 B2
(45) Date of Patent: Jul. 20, 2004

(54) METHOD OF FORMING FIDUCIAL MARKS ON A MICRO-SIZED ARTICLE

(75) Inventors: John Border, Walworth, NY (US); Susan H. Bernegger, Fairport, NY (US); John C. Pulver, Spencerport, NY (US); Morgan A. Smith, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 24 days.

(21) Appl. No.: 10/027,994

(22) Filed: Dec. 20, 2001

(65) Prior Publication Data

US 2003/0117482 A1 Jun. 26, 2003

(51) Int. Cl.[7] .......................... B41J 2/435; G02B 27/10
(52) U.S. Cl. ...................................... 347/224; 359/619
(58) Field of Search ............................... 347/224, 241, 347/244, 256, 258, 225; 359/619, 626; 82/1.11; 427/123, 124, 162; 438/401

(56) References Cited

U.S. PATENT DOCUMENTS

| 4,598,039 | A | 7/1986 | Fischer et al. | 430/323 |
|---|---|---|---|---|
| 5,320,007 | A | * 6/1994 | Weirauch | 82/1.11 |
| 5,771,085 | A | 6/1998 | Ochi et al. | 349/158 |
| 5,850,276 | A | 12/1998 | Ochi et al. | 349/158 |
| 5,853,800 | A | * 12/1998 | Dombrowski et al. | 427/162 |
| 5,951,731 | A | 9/1999 | Tsunetomo et al. | 65/61 |
| 6,005,294 | A | 12/1999 | Tsuji et al. | 257/797 |
| 6,056,448 | A | 5/2000 | Sauter et al. | 385/92 |
| 6,096,155 | A | 8/2000 | Harden et al. | 156/250 |
| 6,329,265 | B1 | * 12/2001 | Miyawaki et al. | 438/401 |

FOREIGN PATENT DOCUMENTS

EP    0 961 690 A    12/1999

OTHER PUBLICATIONS

L. K. Ang et al., "Analysis of Laser Absorption on a Rough Metal Surface," Appl. Phys. Lett. 70 (6), Feb. 10, 1997, pp. 696–698.

* cited by examiner

*Primary Examiner*—Hai Pham
(74) *Attorney, Agent, or Firm*—Clyde E. Bailey, Sr.

(57) ABSTRACT

A method of forming fiducial marks on a micro-sized article has at least one optical feature adjacent the micro-sized article that focuses a collimated beam of light onto a surface opposite the mounting surface of the micro-sized article. Fiducial mark is formed on the surface that enables precise alignment of the micro-sized articles.

17 Claims, 7 Drawing Sheets

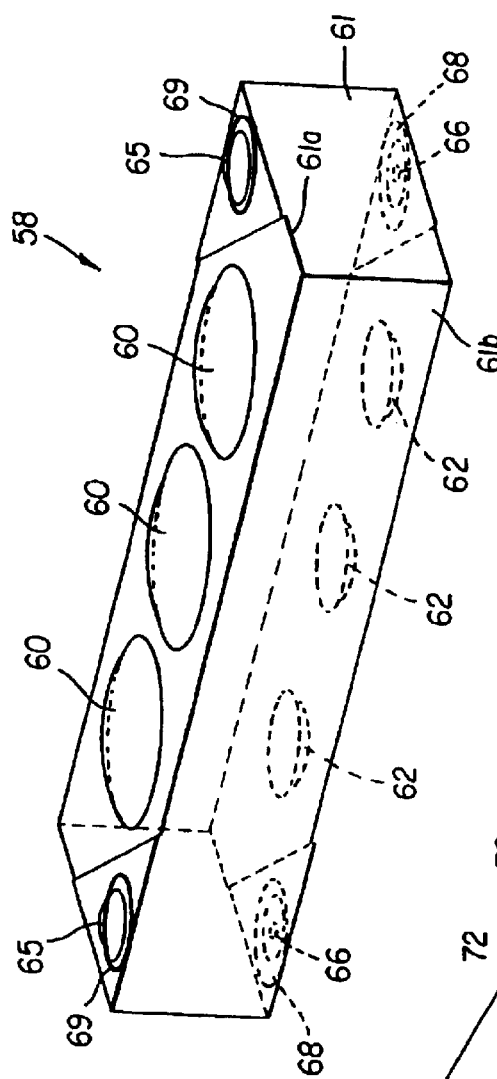
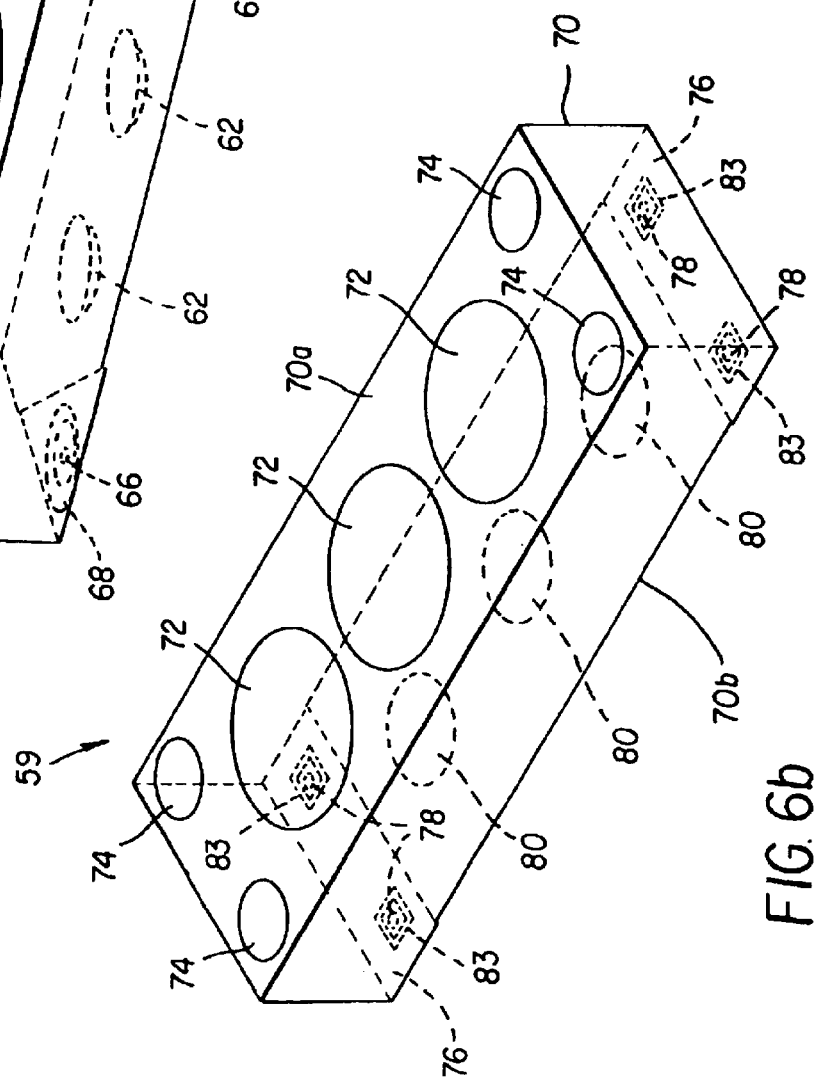

METHOD OF FORMING FIDUCIAL MARKS ON A MICRO-SIZED ARTICLE

CROSS REFERENCE TO RELATED APPLICATIONS

The present application is related to U.S. Pat. No. 6,594,084, issued Jul. 15, 2003 to Border, et al., and entitled, "Method Of Manufacturing A Precisely Aligned Microlens Array;" U.S. Pat. No. 6,515,800, issued Feb. 2, 2003 to Border, et al., and entitled, "Microlens Array;" U.S. Pat. No. 6,587,274, issued Jul. 1, 2003 to Border, et al., and entitled, "Double-Sided Microlens Array And Method Of Manufacturing Same;" U.S. application Ser. No. 10/028,035, filed Dec. 20, 2001 by Boder, et al., and entitled, "Laser Array And Method Of Making Same;" and, U.S. application Ser. No. 10/027,748, filed Dec. 20, 2001 by Border, et al., and entitled, "Fiber Optic Array And Method Of Making Same."

FIELD OF THE INVENTION

The invention relates generally to the field of microlens lens arrays. More particularly, the invention concerns forming fiducial marks on optical articles that require precise alignment in an optical system containing the microlens array.

BACKGROUND OF THE INVENTION

Optical systems, such as imaging systems, telecommunications devices, micro-optical systems, micro-mechanical systems, etc., are typically constructed of several different lenses and optical articles to deliver the desired optical performance. To avoid large overall losses in the optical system, the alignment of each lens and optical article with subsequent lenses and optical articles must be very precise. Fiducial marks are often created on the lenses and optical articles outside the optical area to serve as a reference point during alignment. Fiducial marks are particularly important in the case of aspheric lenses and lens arrays where it is difficult to identify the center of the lens during alignment activities. Fiducial marks are also very important for fiber optic arrays and laser arrays where multiple features dictate the need for a shared alignment reference which is located precisely in relation to all the optical features. As optical systems get smaller for fiber optics applications, like telecommunications and optical sensors, the need increases for precise alignment of the optical components and the accuracy of the associated fiducial marks. Alignment specifications of two (2) microns are now common with a desire to deliver submicron alignment accuracy. Consequently, the fiducial marks must be located with an accuracy of 1 micron or better.

Fiducial marks are well known in the semi-conductor manufacturing industry as an important tool for making multilayer semiconductors. In this case, the fiducial marks are incorporated as part of the semiconductor circuit plan. Due to the thinness (50–100 micron) of the semiconductor layers used in making multilayer semiconductors, the fiducial marks of multiple semiconductor layers can be viewed simultaneously using a high magnification microscope. The high magnification microscope aids in positioning the fiducial marks of one semiconductor layer over the fiducial marks of another semiconductor layer during the alignment process.

Forming fiducial marks in optical articles raises special challenges in that optical surfaces are typically relatively thick, often well over a 1000 micron in thickness. This is the case even in a microlens array that has microlenses that are well under a millimeter in diameter. The thickness of the microlens array makes it virtually impossible to accurately locate a fiducial mark by looking through the microlens array due to optical limitations. On the one hand, the location accuracy of the fiducial mark relative to the optical article is limited because the fiducial mark is displaced by refracted light passing through the microlens array material. Moreover, the thickness of the microlens array limits how close the microscope used for identifying the microlens array can be positioned to the fiducial mark. Consequently, only lower magnification microscopes can be used to look at the fiducial. Therefore, for optical articles, a method of applying a very accurately located fiducial mark on the side opposite to the optical article is needed.

In U.S. Pat. No. 6,005,294, by Tsuji et al., Dec. 21, 1999, entitled "Method Of Arranging Alignment Marks," a method of making semiconductor devices uses multiple fiducial marks in such a way that the area occupied by the fiducial marks is reduced and the manufacturing productivity is correspondingly increased. While this patent does describe the state of the art for making semiconductor devices, the alignment process described therein is not appropriate for optical articles like lens arrays. As mentioned, in lens arrays, the significant thickness of the various lenses makes it impossible to view fiducial marks from multiple optical articles simultaneously due to the separation distance imparted by the material thickness of the lenses.

Also, U.S. Pat. No. 5,850,276, by Ochi et al., Dec. 15, 1998, entitled "Method Of Making LCD Device Having Alignment Mark Made Of Same Material And Formed At Same Time As Microlenses" and U.S. Pat. No. 5,771,085, by Ochi et al., Jun. 23, 1998, entitled "LCD Device With an Alignment Mark Having Same Material As Microlenses" each describe a process for molding fiducial marks into a microlens screen used for liquid crystal display devices. In these patents the shapes of the fiducial marks are also described in detail. The fiducial marks as described are protrusions in the shape of a cross or several other variations, located on the same side as the microlenses. The protrusions can be semicircular in cross section or another shape as long as the grooves between the protrusions stand out as dark lines when viewed with a reflecting microscope. The references recognize that lens characteristics, such as thickness, interfere with the ability to identify underlying fiducial marks. Further, the references show some appreciation for useful geometries of fiducial marks and for fiducial marks molded along with a microlens array. However, neither of the patents show appreciation for fiducial marks applied on the side opposite the optical surfaces in the microlens array. Furthermore, there is no appreciation by either of the references that advantages can be gained with a molded fiducial mark having lens characteristics.

Moreover, U.S. Pat. No. 6,096,155, by Harden et al., Aug. 1, 2000, entitled "Method Of Dicing Wafer Level Integrated Multiple Optical Elements" discloses the use of fiducials to aid in alignment of microlenses on wafers during the bonding of multiple wafers together prior to dicing. This patent generally teaches making integrated multiple optical elements with features to help control the thickness of adhesives and solders used to bond together the wafers. While effective use of the fiducial marks is described, there is absolutely no mention of ways to improve alignment of fiducial marks on one side with the optical element on the other side of the wafer. The techniques of embossing and molding fiducial marks, described in the patent, both suffer from locational inaccuracies from one side to the other o the order of plus or minus ten (10) microns. In molded microlenses and microlens arrays this inaccuracy is not acceptable.

Furthermore, U.S. Pat. No. 4,598,039, by Fischer et al., Jul. 1, 1986, entitled "Formation Of Features In Optical Material" describes the use of a laser to remove optical material in a controlled fashion. The laser can be used directly on the optical material or a layer of ablative absorber material can be put onto the surface of the optical material to enhance the coupling to the laser. This ablative technique is well suited to making fiducial type marks for alignment. However, the reference does not show appreciation for how to align the laser with a lens array that is located on the opposite side from the desired location for the fiducial marks.

Therefore, a need persists in the art for a method of forming fiducial marks onto optical articles and optical arrays on a surface opposite the optical article surface that enables precise alignment of the articles and optical arrays. Moreover, there is a compelling need for a special optical feature molded along with optical surfaces to focus light onto an opposing surface of the optical article or optical array thus enabling the formation of a fiducial mark onto the opposing surface with great accuracy.

SUMMARY OF THE INVENTION

It is, therefore, an object of the invention to provide a method for making fiducial marks on a micro-sized article where the fiducial mark is located on a surface opposite the surface of the micro-sized article.

It is a further object of the invention to utilize an optical feature made in conjunction with the micro-sized article that focuses a high intensity beam of light onto the surface opposite the surface of micro-sized article to thereby form a fiducial mark.

To accomplish these and other objects, features and advantages of the invention, there is provided, in one aspect of the invention, a method of forming fiducial marks on a micro-sized article supportedly mounted on a first surface of a transparent medium. The transparent medium has a second surface opposite the first surface. In the preferred embodiment, at least one optical feature is arranged adjacent the micro-sized article at a predetermined location on the first surface of the transparent medium. At least a portion of the second surface of the transparent medium is altered or treated for subsequent processing. A collimated beam of light is directed onto the optical feature that in turn focuses the collimated beam of light onto the second surface to form a correspondingly precisely located at least one fiducial mark thereon opposite the optical feature.

Consequently, the present invention has numerous advantages over prior art developments, including: it results in precision locating of fiducial marks; it is a far superior method of aligning optical articles in an array; and, it is significantly easier to implement since all required optical features are formed with the same forming process.

BRIEF DESCRIPTION OF THE DRAWINGS

The foregoing as well as other objects, features and advantages of this invention will become more apparent from the appended Figures, wherein like reference numerals denote like elements, and wherein:

FIGS. 6a and 6b are perspective views of an alternative embodiment of the invention having a plurality of optical articles on either face of the transparent medium with corresponding fiducial marks on opposing surfaces in the transparent medium opposite the optical article;

DETAILED DESCRIPTION OF THE INVENTION

Figure 1A:
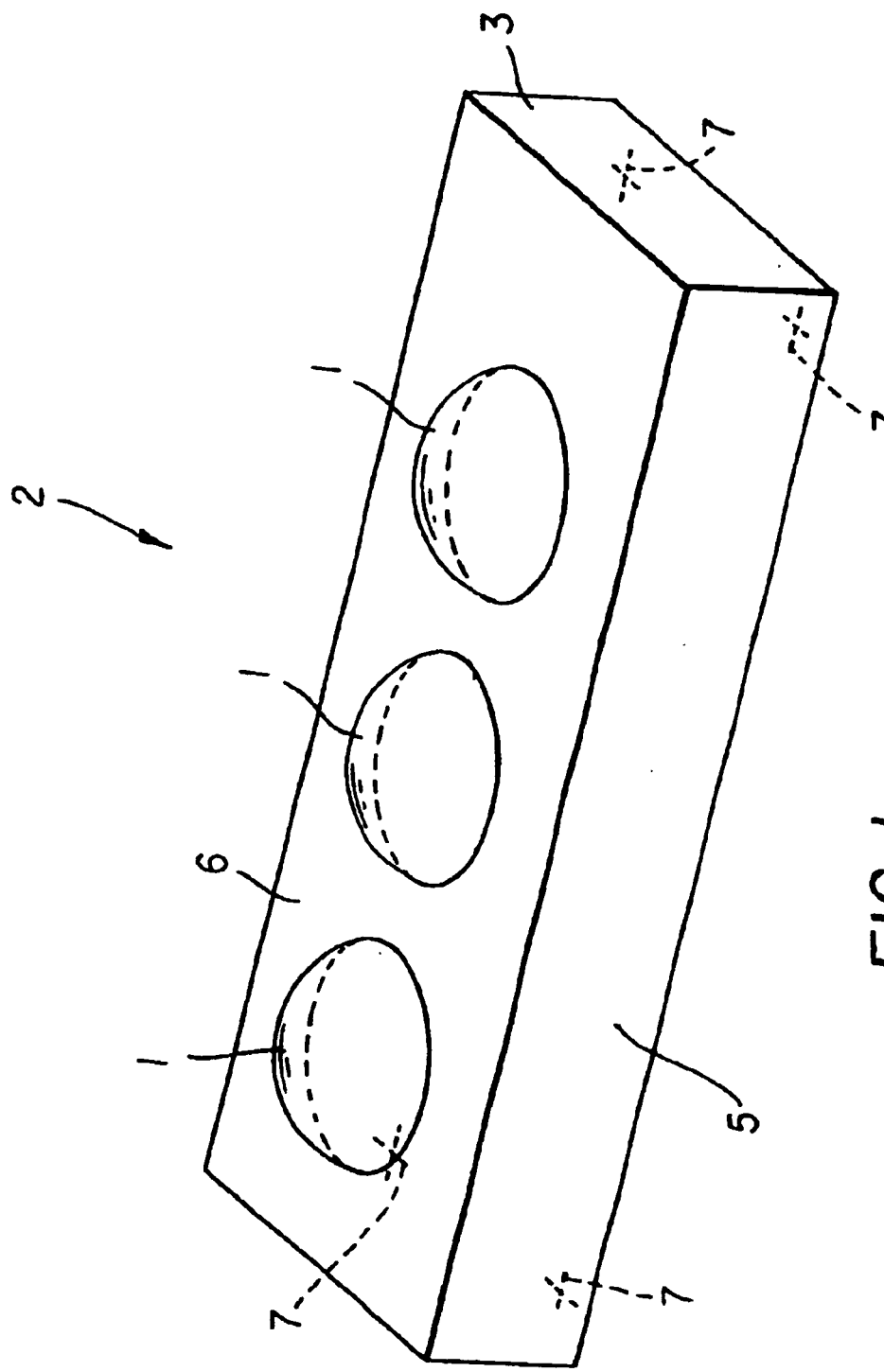
FIG. 1a is a perspective view of a prior art lens array with fiducial marks located on the side opposite the lens surfaces.

A typical prior art microlens array 2 is illustrated in FIG. 1a for comparative purposes. According to FIG. 1a, microlens array 2 has multiple microlenses 1 mounted coincidentally on a mounting flange 3. Fiducial marks 7 are located on a surface 5 of mounting flange 3 opposite the surface 6 of microlenses 1. Fiducial marks 7 would either be directly molded onto surface 5 or would be applied after referencing an edge of the optical surface from the opposite side of mounting flange 3. In the case of direct molding of the fiducial marks 7, mold misalignment due to clearance in the alignment pins across the molded parting line would limit the accuracy of fiducial mark 7 to approximately 15 microns or more. Using the edge referencing technique, experience has taught that each measurement introduces approximately 2–5 microns of inaccuracy. Since a minimum of three (3) measurements are required to identify an edge of a round lens, the total inaccuracy is a minimum of 6–15 microns to place the fiducial mark 7. While this inaccuracy is usually acceptable for large optical articles, as the size of optics for applications such as fiber optics shrinks below 1000 micron, the alignment accuracy required shrinks as well. Consequently, it is not uncommon for alignment accuracy of microlenses to be 5 microns or better with some applications calling for 2 micron alignment. Obviously, the accuracy of the fiducial marks 7 must be better than the alignment accuracy required.

Figure 1B:
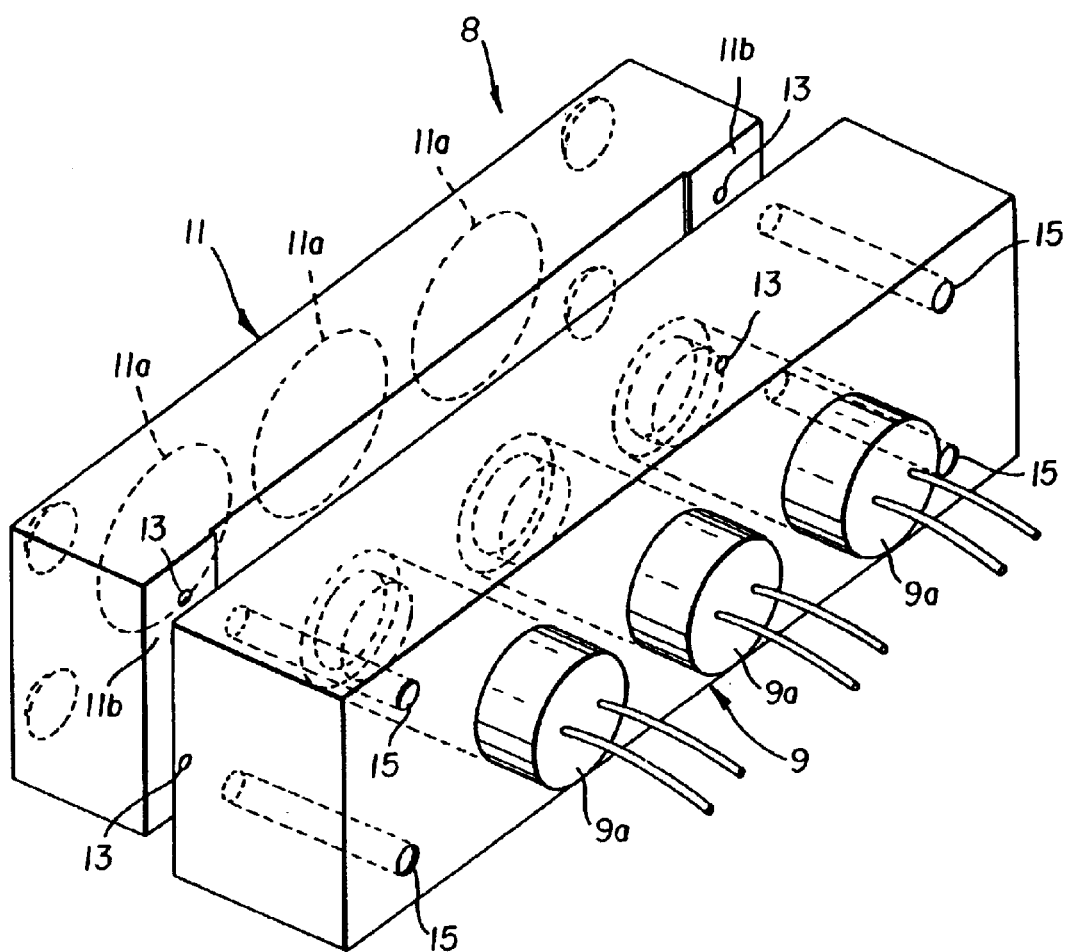
FIG. 1b is a perspective view of an optical system made in accordance with the method of the invention.

Turning now to FIG. 1b, fiducial marks 13 formed in an optical article array, such as refractive lens array 11, using the method of the invention is illustrated. In this embodiment, fiducial marks 13 are used to align an optical assemblage 8 comprising refractive lens array 11 and laser array 9. As described in the invention, additional optical features means. According to FIG. 1b, fiducial marks 13 on the lens array 11 are precisely located on opposing surface 11b of lens array 11. To ensure precise alignment of optical assemblage 8, each one of a plurality of precision through-holes 15 formed in laser array 9 is alignably centered over a corresponding fiducial mark 13 in lens array 11. This process aligns each of the lasers 9a in the laser array 9 with a refractive lens 11a in the refractive lens array 11. After the optical assemblage 8 is aligned, it is rigidly affixed typically by potting in a suitable adhesive material. Precise alignment of precision through-holes 15 over the fiducial marks 13 is accomplished with a high power microscope (not shown) often with a computerized vision system linked to a computerized positioning system to automate the process.

Figure 2:
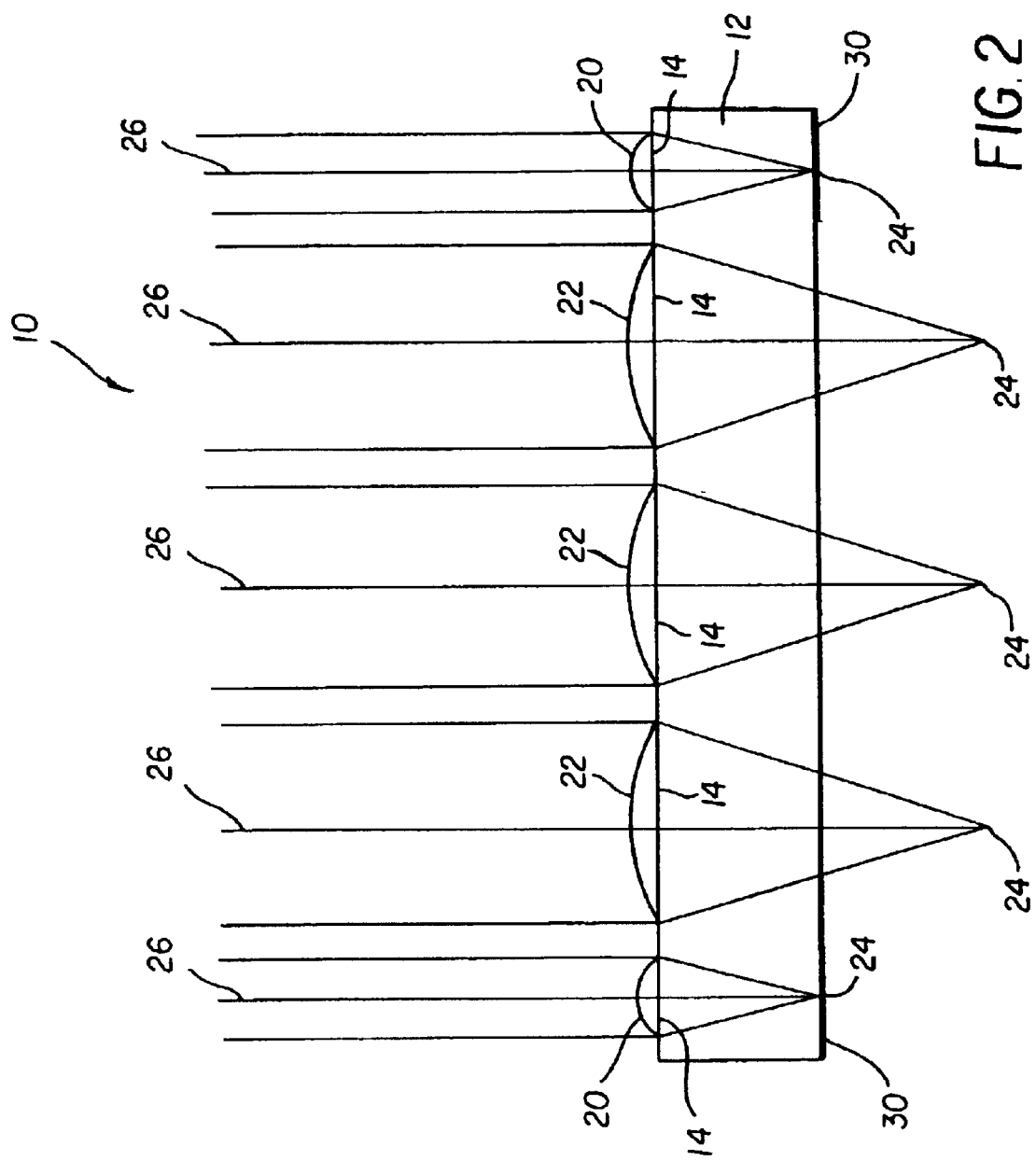
FIG. 2 is an elevated side view of a microlens array set in a transparent medium having optical features formed in accordance with the method of the invention.
Figure 3:
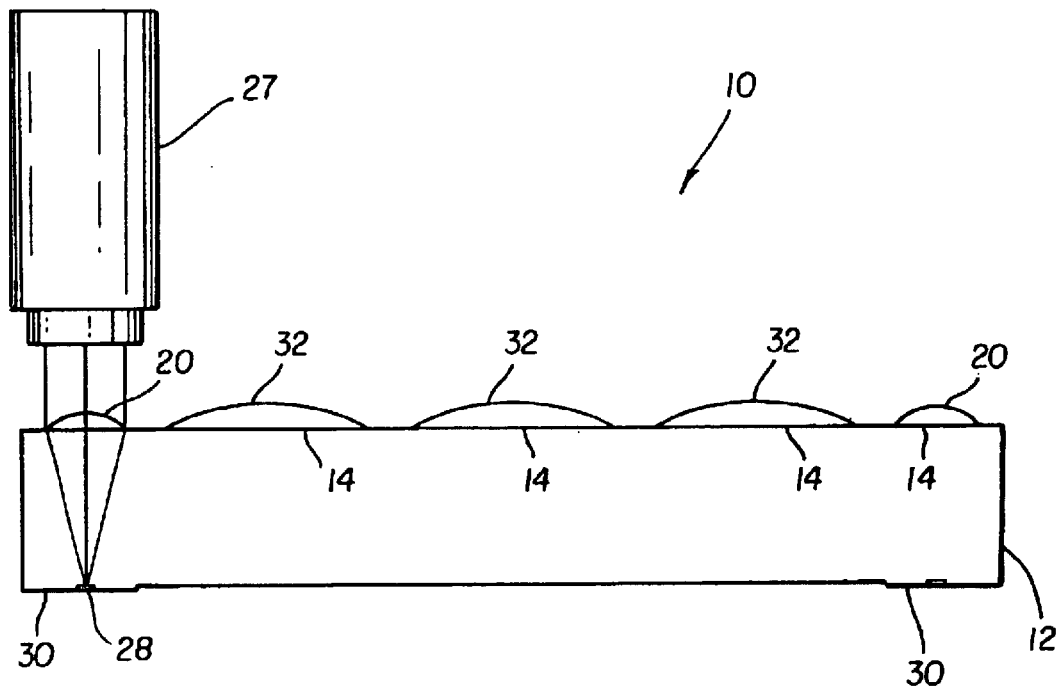
FIG. 3 is an elevated side view of a microlens array set in a transparent medium with a fiducial mark forming means arranged for forming fiducial marks on an opposing surface of the transparent medium.

Referring to FIGS. 2 and 3, an optical array 10 having accurately located fiducial marks 24, 28 formed on an opposing surface 30 of a transparent substrate 12 is illustrated. According to FIGS. 2 and 3, optical articles, such as microlens array 22, 32, are supported on mounting surface 14 of transparent substrate 12 that is opposite surface 30. Important to the invention, an additional optical feature 20 (described below) is formed adjacent to the microlens array 22, 32 to aid in precisely forming fiducial marks 25, 29 at focal points 24, 28. According to FIG. 2, focal point 24 (corresponding to a fiducial mark 25) is then produced with a high intensity collimated beam of light 26. As shown in FIG. 3, a laser source 27 may be used to produce such high intensity light 26. The additional optical feature 20 receives the collimated beam of light 26 from laser source 27 and precisely focuses it 28 onto opposing surface 30 of the microlens array 10. It is also important to the invention that prior to forming the fiducial marks 25, 29 at focal points 24, 28, surface 30 of the transparent substrate 12 is altered or treated in the area 31 where the fiducial marks 25, 29 are to be formed. The objective of altering or treating surface 30 is to make suitably visible fiducial marks 25, 29 when exposed to the focused high intensity light 26. Suitable surface altering techniques include dip coating, roughening, spin coating, vacuum coating, metallizing, among others.

Skilled artisans will appreciate that there are several processes that may be used for forming a mold for making optical articles, such as optical array 10, which includes additional optical features 20 as described. Such processes include lithographic printing, ink jet printing, indentation, diamond turning and diamond milling, each of which can deliver a position to position accuracy of 0.25 micron. Importantly, the method of the present invention uniquely uses the process for forming the microlens array 32 for also forming the additional optical features 20 that precisely locates the fiducial marks 25, 29 at focal points 24, 28.

Figure 4:
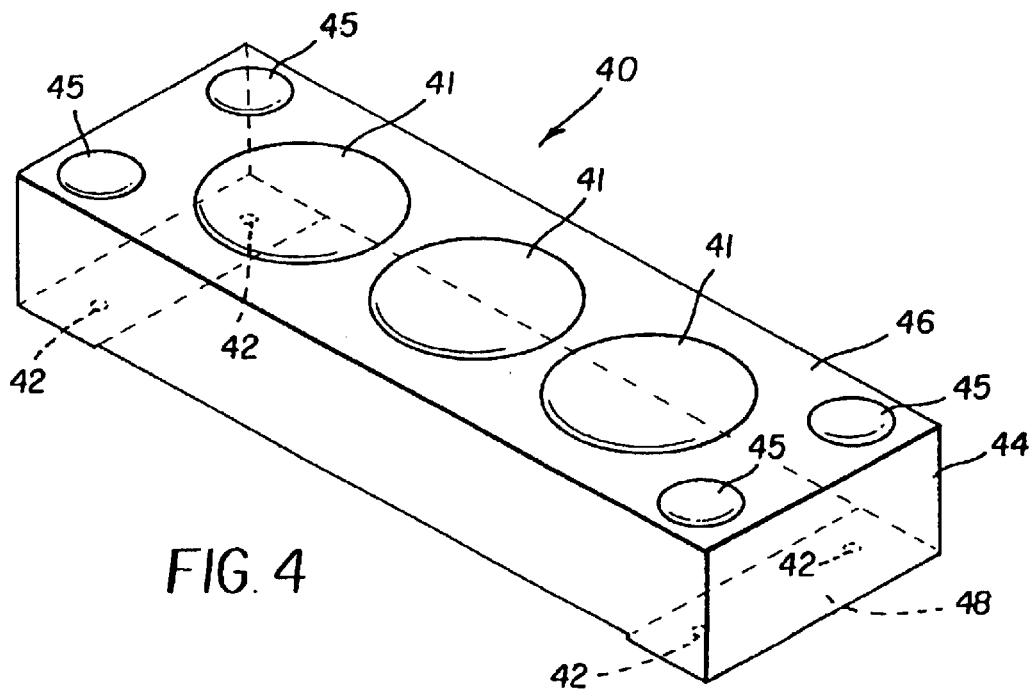
FIG. 4 is a perspective view of the optical article having generally circular fiducial marks on a surface opposite the optical article.
Figure 5:
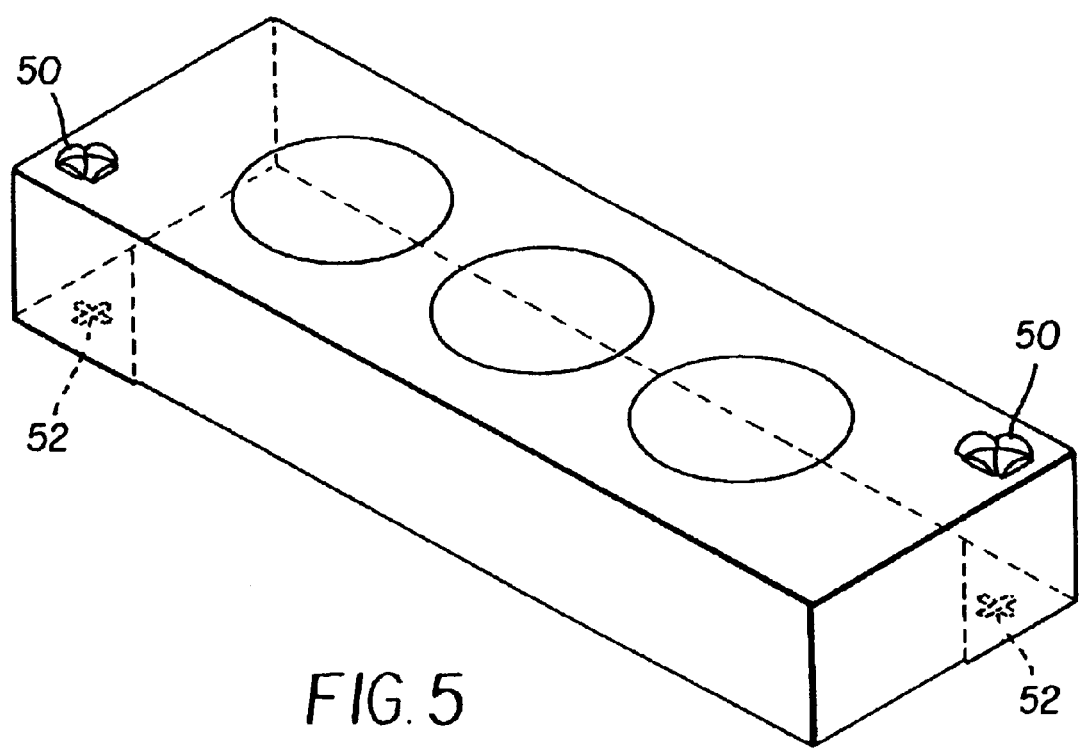
FIG. 5 is a perspective view of the optical article of the invention having a generally linear crossed fiducial mark on a surface opposite the optical article.

Referring to FIGS. 4 and 5, optical features having a variety of configurations with refractive or diffractive lenses can be used to create various shaped fiducial marks. According to FIG. 4, a lens array 40 has a plurality of lenses 41 formed on first surface 46 of transparent medium 44. Generally round refractive lens feature 45 can be used to make a generally round fiducial mark 42 on the treated portion 49 of second surface 48 of transparent medium 44, opposite first surface 46 of the transparent medium 44. Moreover, to produce a generally linear fiducial mark, a generally linear lens feature is required (not shown). According to FIG. 5, a generally crossed linear refractive lens feature 50 is used to produce a generally crossed-shaped (X-shaped) fiducial mark 52. Those skilled in the art will now appreciate that other patterns for the optical feature can be produced by a combination of refractive and diffractive optical features.

Referring to FIGS. 6a and 6b, in another embodiment of the invention, double-sided optical arrays 58, 59 are illustrated. According to FIG. 6a, double-sided optical array 58 has an arrangement of optical articles 60, 62 on either of opposing surfaces 61a, 61b in transparent medium 61. Fiducial marks 69, 66 are formed on the treated portions 63, 64 of the opposing surfaces 61a, 61b, respectively, by repeating the fiducial marking process described hereinabove. According to FIG. 6b, alternatively, double-sided optical array 59 has optical features 72, 80 mounted on opposing surfaces 70a, 70b of transparent medium 70. In this embodiment, two sets of fiducial marks 78, 83 are formed only the treated portion 76 of surface 70b opposite surface 70a so the misalignment between the two optical articles 72, 80 could be easily determined.

Referring again to FIG. 6a, double-sided optical array 58, more particularly, has a first plurality of lenses 60 matched to a second plurality of lenses 62, both being mounted on opposing surfaces 61a, 61b of transparent medium 61. Two complimentary sets of additional optical features 65, 68 are formed in either of opposing surfaces 61a, 61b, respectively. Optical features 65, 68 are used to form fiducial marks 66, 69 on the opposing surfaces 61b, 61a, respectively. As shown in FIG. 6a, optical feature 65 has a generally round shape which forms a generally round shaped fiducial mark 66 on the opposing surface 61b. In the same alternative, double-sided optical array 58, a generally ring shaped optical feature 68 formed on surface 61b produces a generally ring shaped fiducial mark 69. Alternatively, fiducial marks 66, 69 and optical features 68, 65 can be used as matching reference marks to measure the relative alignment of the optical articles 60, 62 on surfaces 61a, 61b by measuring the relative centering of the fiducial marks 66, 69 from the optical features 65, 68.

It is the experience of the inventors that by using both refractive and diffractive lenses in the additional optical lens features, a wide variety of fiducial mark shapes can be created to fit different requirements. The additional optical lens feature can also be designed for different wavelengths if the fiducial marking is to be done using a light source that operates at a different wavelength than used by the optical array.

Referring again to FIG. 6b, another embodiment of a double-sided optical array 59 is illustrated. As described above, a first plurality of lenses 72 in optical array 59 has additional generally round optical features 74 formed on surface 70a of transparent substrate 70. Optical features 74 provide precise focusing of the collimated beam of light (FIG. 2) onto opposing surface 70b which forms a generally round fiducial mark 78 on a treated portion 76 of opposing surface 70b. In this embodiment, the second plurality of lenses 80 is formed on opposing surface 70b of transparent medium 70. Further, generally square fiducial marks 83 have been produced along with lenses 80 on the treated portion 76 of surface 70b. The alignment of the first plurality of lenses 72 to the second plurality of lenses 80 is preferably determined by measuring the magnitude and direction of the de-centering, i.e., the distance from an imaginary centerline passing through the lenses to the fiducial mark of fiducal mark 78 to fiducal mark 83.

Figure 7:
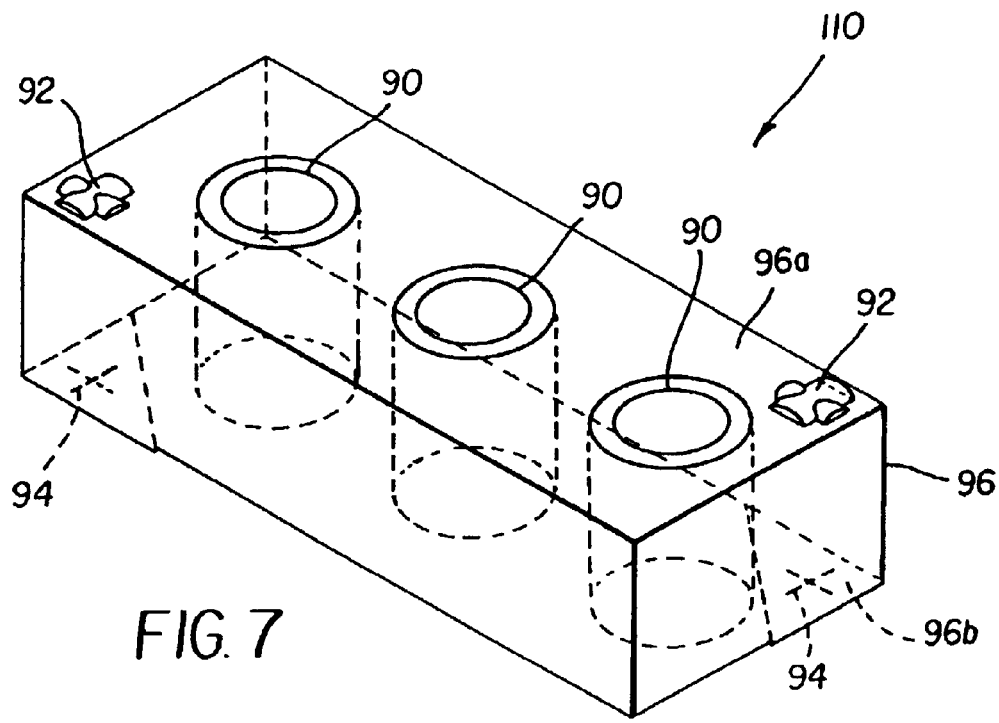
FIG. 7 is a perspective view of an alternative embodiment of the invention comprising a laser array; and, FIG. 8 is a perspective view of another embodiment of the invention comprising a fiber optic array.
Figure 8:
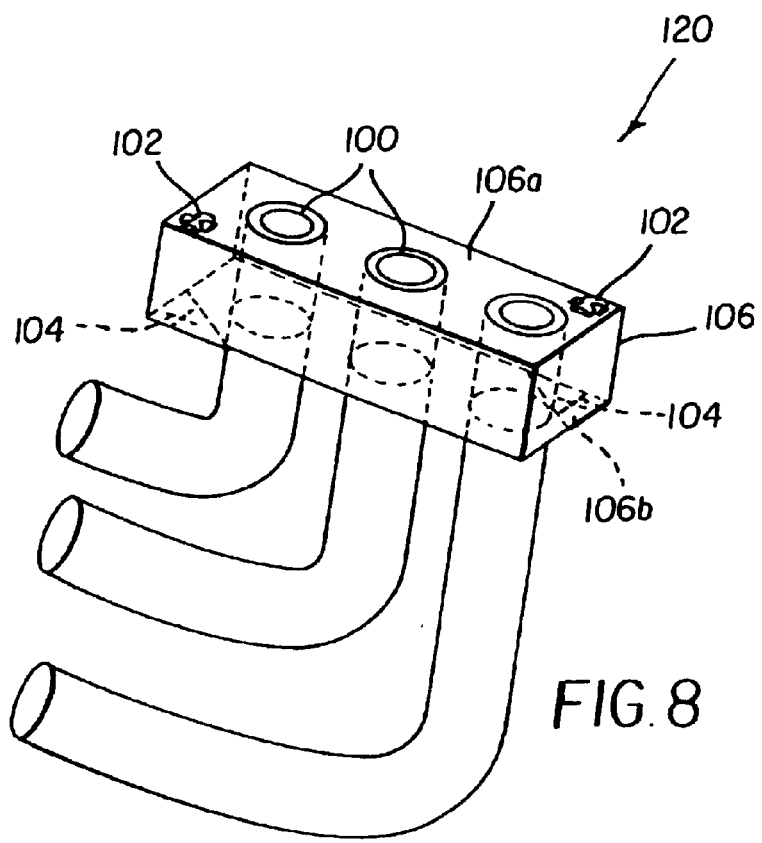

In FIGS. 7 and 8, two additional embodiments of the invention are illustrated. According to FIG. 7, a laser array 110, having lasers 90, includes two additional optical features or crossed linear lenses 92 that produce fiducial marks 94 in the form of a cross (X) on the treated portion 97 of opposing surface 96b. Lasers 90 may be arranged in openings in transparent medium 96 or they may be bonded to first surface 96a of transparent medium 96. According to FIG. 8, a fiber optic array 120, having fiber optic units 100 formed in transparent substrate 106, includes additional optical features 102 adjacent to fiber optic units 100 that are used to produce fiducial marks 104 on the treated portion 107 of opposing surface 106b of the fiber optic array 120. The fiber optic units 100 may be formed in transparent substrate 106 or they may be bonded to first surface 106a. The same process, described above, for forming fiducial mark 94, 104, is used in the present embodiments of the invention.

The invention has been described with reference to various embodiments thereof. However, it will be appreciated that variations and modifications can be effected by a person of ordinary skill in the art without departing from the scope of the invention.

PARTS LIST 1 microlens
2 prior art microlens array
3 mounting flange
5 surface of mounting flange 3
6 surface of mounting flange 3 supporting microlens 1
7 fiducial marks on opposing surface 5
8 optical assemblage
9 laser array
9a lasers in laser array 9
10 optical array
11 refractive lens array
11a refractive lens in refractive lens array 11
11b surface for fiducial marks
12 transparent substrate
13 fiducial marks for refractive lens array 11
14 mounting surface
16 additional optical feature used to form fiducial marks 13
15 precision through-holes
20 additional optical feature
22 microlens array
24 focal point of additional optical feature 20 on an opposite surface to the microlens array
25 fiducial mark
26 high intensity collimated beam of light
27 laser source
28 focal point produced by the collimated light 26 passing through the additional optical features 20
29 fiducial mark
30 fiducial marking area on the opposite side of the microlens array 22
31 treated area on surface 30
32 multiple lens refractive lens array
40 lens array
41 plurality of lenses
42 generally round fiducial mark
44 transparent medium
45 generally round refractive lens feature
46 first surface of transparent medium 44
48 second surface of transparent medium 44
49 treated area of surface 48
50 crossed linear refractive lens feature
52 cross-shaped fiducial mark
58 alternative double-sided optical array
59 alternative double-sided optical array
60 optical articles (first plurality of lenses in optical array 58)
61 transparent medium
61a, b opposing surfaces in transparent medium 61
62 optical articles (second plurality of lenses in optical array 58)
63 treated portion of surface 16a
64 treated portion of surface 61b
65 round upper additional optical feature
66 found fiducial mark
68 ring-shaped lower additional optical feature
69 ring-shaped fiducial mark
70 transparent medium
70a, b opposing surfaces in transparent medium 70
72 optical features (first plurality of lenses in lens array 59)
74 round additional optical feature
76 treated portion of opposing surface 70b
78 round spot fiducial marks
80 optical features (second plurality of lenses in lens array 59)
83 square fiducial mark
90 lasers
92 crossed linear lens on laser array 110
94 X-shaped fiducial marks on lower surface
96 transparent medium of laser array 110
96a first surface of transparent medium 96
96b second surface of transparent medium 96
97 treated portion of surface 96b
100 fiber optic units
102 additional optical feature
104 X-shaped fiducial marks on lower surface
106 transparent medium of fiber optic array 120
106a first surface of transparent medium 106
106b opposing surface of transparent medium 106
107 treated portion of surface 106b
110 laser array
120 fiber optic array

What is claimed is:

1. Method of forming fiducial marks on a microlens array supportedly mounted on a first surface of a transparent medium, said transparent medium having a second surface opposite said first surface, comprising:
    forming at least one optical feature adjacent said microlens array at predetermined location on said first surface of said transparent medium;
    altering least a portion of said second surface of said transparent medium;
    directing a collimated beam of light onto said at least one optical feature, said at least one optical feature focusing said collimated beam of light onto said second surface thereby forming a correspondingly precisely located at least one fiducial mark thereon opposite said at least one optical feature.

2. The method recited in claim 1 wherein said collimated beam of light is produced by a laser.

3. The method recited in claim 1 wherein said at least one has a predetermined configuration.

4. The method recited in claim 3 wherein said predetermined configuration of said at least one optical feature is generally circular thereby forming a generally circular fiducial mark on said second surface.

5. The method recited in claim 3 wherein said predetermined configuration of said at least one optical feature is generally linear thereby forming a generally linear fiducial mark on said second surface.

6. The method recited in claim 3 wherein said predetermined configuration of said at least one optical feature is generally crossed linear thereby forming a generally crossed linear fiducial mark on said second surface.

7. The method recited in claim 3 wherein said predetermined configuration of said at least one optical feature is generally a diffractive element thereby producing a generally complex-shaped at least one fiducial mark.

8. The method recited in claim 1 wherein said step of altering includes the step of ablating said at least a portion of said second surface so as to distinguish said at least one fiducial mark formed thereon.

9. The method recited in claim 1 wherein said step of forming said at least one optical feature includes the step of diamond milling.

10. The method recited in claim 1 wherein said step of forming said at least one optical feature includes the step of diamond turning.

11. The method recited in claim 1 wherein said step of forming said at least one optical feature includes the step of indentation.

12. The method recited in claim 1 wherein said step of altering includes the step of painting said at least a portion of said second surface so as to distinguish said at least one fiducial mark formed thereon.

13. The method recited in claim 1 wherein said step of altering includes the step of metallizing said at least a portion of said second surface so as to distinguish said at least one fiducial mark formed thereon.

14. The method recited in claim 1 wherein said step of altering includes the step of vacuum coating said at least a portion of said second surface so as to distinguish said at least one fiducial mark formed thereon.

15. The method recited in claim 1 wherein said step of altering includes the step of roughening said at least a portion of said second surface so as to distinguish said at least one fiducial mark formed thereon.

16. The method recited in claim 1 wherein said step of altering includes the step of spin coating said at least a portion of said second surface so as to distinguish said at least one fiducial mark formed thereon.

17. The method recited in claim 1 wherein said step of altering includes the step of dip coating said at least a portion of said second surface so as to distinguish said at least one fiducial mark formed thereon.

* * * * *